(12) United States Patent
Hashimoto (10) Patent No.: US 10,004,042 B2
(45) Date of Patent: Jun. 19, 2018

(54) LOCATION INFORMATION TRANSMISSION APPARATUS

(71) Applicant: TDK CORPORATION, Tokyo (JP)

(72) Inventor: Kazunori Hashimoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days. days.

(21) Appl. No.: 15/442,840

(22) Filed: Feb. 27, 2017

(65) Prior Publication Data

US 2017/0257828 A1    Sep. 7, 2017

(30) Foreign Application Priority Data

Mar. 4, 2016 (JP) ................................. 2016-042360

(51) Int. Cl.
*H04W 52/02* (2009.01)
*H04W 4/02* (2018.01)

(52) U.S. Cl.
CPC ....... *H04W 52/0254* (2013.01); *H04W 4/027* (2013.01)

(58) Field of Classification Search
CPC ..... G01C 21/00; G06F 19/3406; H04L 67/12; H04W 4/02; H04W 64/00; H04W 4/027; H04W 52/0254; G01S 19/42; G01S 19/16
See application file for complete search history.

(56) References Cited

U.S. PATENT DOCUMENTS

| | | | | |
|---|---|---|---|---|
| 9,060,248 | B1* | 6/2015 | Coulombe | H04W 4/021 |
| 2009/0212957 | A1* | 8/2009 | Burris | A61B 5/1112 |
| | | | | 340/573.4 |
| 2011/0148626 | A1* | 6/2011 | Acevedo | G01S 5/0027 |
| | | | | 340/539.13 |
| 2011/0199256 | A1* | 8/2011 | Chu | G01S 5/0027 |
| | | | | 342/357.25 |
| 2014/0206293 | A1* | 7/2014 | Sanchez-Valenzuela | G08B 29/185 |
| | | | | 455/67.11 |
| 2014/0297310 | A1* | 10/2014 | Collins, Jr. | G06F 19/327 |
| | | | | 705/2 |
| 2015/0063079 | A1* | 3/2015 | Kotaki | G04R 20/02 |
| | | | | 368/47 |
| 2015/0163632 | A1* | 6/2015 | Phillips | G08B 21/0236 |
| | | | | 455/456.3 |
| 2016/0117910 | A1* | 4/2016 | Rajala | H04W 4/021 |
| | | | | 340/539.13 |
| 2016/0223993 | A1* | 8/2016 | Yamaguchi | G04F 10/00 |
| 2016/0358432 | A1* | 12/2016 | Branscomb | G08B 13/1965 |
| 2017/0150308 | A1* | 5/2017 | Jones | H04W 4/021 |

FOREIGN PATENT DOCUMENTS

JP    2001-074494 A    3/2001

* cited by examiner

*Primary Examiner* — Nizar Sivji
(74) *Attorney, Agent, or Firm* — Oliff PLC

(57) ABSTRACT

A location information transmission apparatus includes a location information measuring unit configured to receive a radio wave from outside to acquire location data, a storage unit configured to store the location data, a location information transmitting unit configured to transmit the location data stored in the storage unit to the outside, a movement detecting unit configured to detect an amount of movement, and a transmission control unit configured to, in a case where the movement detecting unit detects an amount of movement equal to or greater than a predetermined amount, cause the location data to be transmitted from the location information transmitting unit to the outside.

10 Claims, 5 Drawing Sheets

LOCATION INFORMATION TRANSMISSION APPARATUS

CROSS-REFERENCE TO RELATED APPLICATION

This application is based upon and claims the benefit of priority from the prior Japanese Patent Application No. 2016-42360 filed on Mar. 4, 2016; the entire contents of which are incorporated herein by reference.

FIELD

The present embodiment relates to a location information transmission apparatus.

BACKGROUND

In recent years, in order to watch over elderly persons or children or recognize or manage locations of moving objects such as pets, a portable location information transmission apparatus has been developed, which automatically acquires location information and transmits the location information to a predetermined server, or the like, through a radio communication network in real time or every certain time period.

Typically, the portable location information transmission apparatus is powered by a battery and continuously transmits location information until the battery runs down. Transmission operation using the radio communication network requires power from several times to tens of times of power required in location measurement using a GPS, or the like, and dominantly accounts for a time period during which the apparatus operates using the battery.

However, with the conventional location information transmission apparatus, there is a problem that, because the acquired location information is continuously transmitted in real time or every certain time period, large power is consumed, and it is necessary to frequently perform charging.

DETAILED DESCRIPTION

A location information transmission apparatus of an embodiment includes a location information acquiring unit configured to receive a radio wave from outside to acquire location data, a storage unit configured to store the location data, a transmitting unit configured to transmit the location data stored in the storage unit to the outside, a movement detecting unit configured to detect an amount of movement, and a transmission judging unit configured to, in a case where the movement detecting unit detects an amount of movement equal to or greater than a predetermined amount, cause the location data to be transmitted from the transmitting unit to the outside.

The embodiment will be described below with reference to the drawings.

(Configuration)

Figure 1:
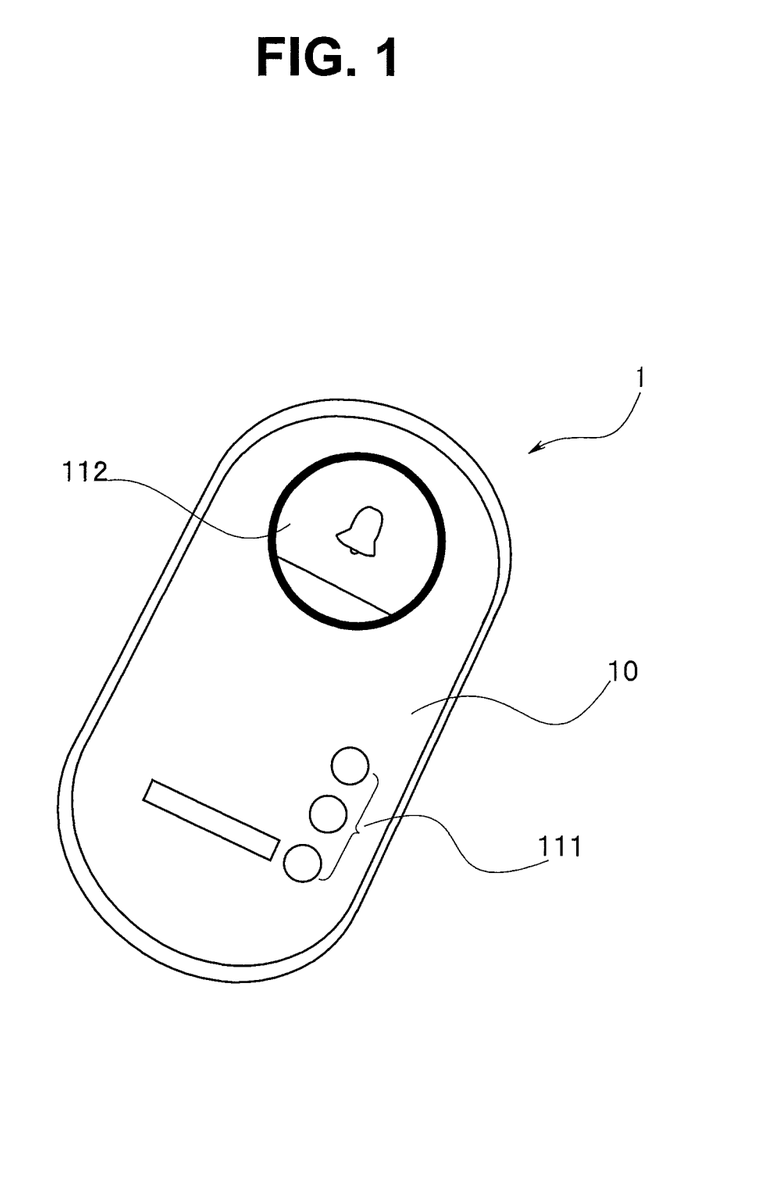
FIG. 1 is an external view illustrating an example of a location information transmission apparatus according to an embodiment.

FIG. 1 is an external view illustrating an example of the location information transmission apparatus according to the embodiment. As illustrated in FIG. 1, the location information transmission apparatus 1 is a portable apparatus in which a body 10 having an oval shape, a display lamp portion 111 and an alarm button 112 are disposed. The location information transmission apparatus 1 is used by being carried by a person whose location information is to be managed, (such as an elderly person and a child, hereinafter, referred to as a target) or by being worn by a pet or a moving object.

Figure 2:
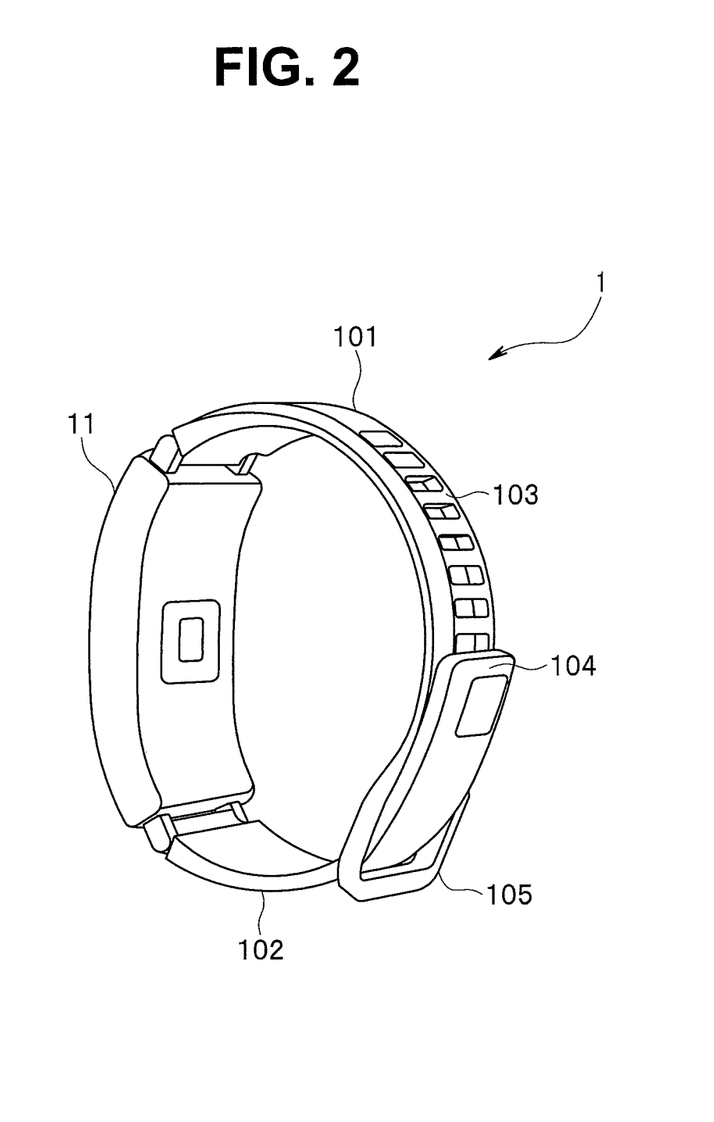
FIG. 2 is an external view illustrating another example of the location information transmission apparatus according to the embodiment.

FIG. 2 is an external view illustrating another example of the location information transmission apparatus according to the embodiment. As illustrated in FIG. 2, the location information transmission apparatus 1 can be configured as a wristband type apparatus which is configured to include a body portion 11 and a wearing portion 101. The location information transmission apparatus 1 is used by being worn around a wrist of a forearm of the target.

The wearing portion 101 is configured to include two bands 102 and 103 which are attached to both end portions in a longitudinal direction of the body portion 11. The wearing portion 101 is worn around the forearm of the target. The two bands 102 and 103 are each formed to have an elongated belt-like shape, and are configured to include attachments 104 and 105 at tips. The target places the body portion 11 at an external side (side of back of his/her hand) of the forearm, brings each of the two bands 102 and 103 around the forearm toward an internal side (side of a palm of his/her hand) of the forearm, fastens the attachments 104 and 105 to wear the apparatus on the forearm.

Figure 3:
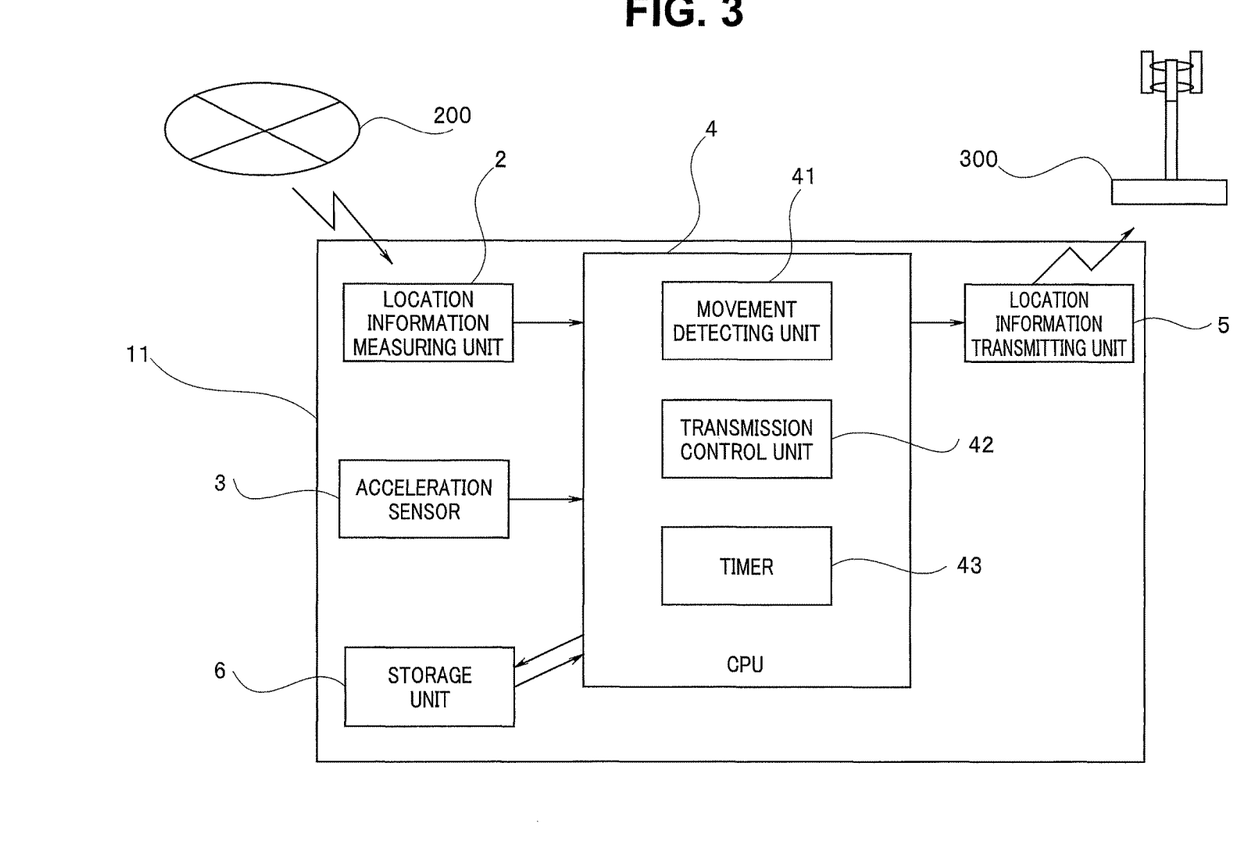
FIG. 3 is a block diagram illustrating a configuration of the location information transmission apparatus according to the embodiment.

FIG. 3 is a block diagram illustrating a configuration of the location information transmission apparatus according to the embodiment. As illustrated in FIG. 3, the body portion 11 is configured to include a location information measuring unit 2, an acceleration sensor 3, a central processing unit (hereinafter, referred to as a CPU) 4, a location information transmitting unit 5 and a storage unit 6.

The location information measuring unit 2 as the location information acquiring unit receives a radio wave from a GPS (global position system) satellite 200 to specify a location and generates and outputs location data. The location data is acquired at a predetermined time period interval 1 which falls within a range between approximately 2 minutes and 15 minutes and is output. Note that means configured to acquire the location data is not limited to the GPS and, for example, a radio wave emitted from a public line such as Beacon, WiFi and a mobile base station may be used.

The acceleration sensor 3, which is, for example, a triaxial acceleration sensor, is configured to include three sensors so as to be able to respectively detect acceleration in three axis directions (an X axis, a Y axis and a Z axis) which are orthogonal to one another. Acceleration data output from the acceleration sensor includes X axis data which is a first component, Y axis data which is a second component and Z axis data which is a third component. The acceleration sensor 3 can transmit the acceleration data formed with the X axis data, the Y axis data and the Z axis data to the CPU 4 every predetermined time period A.

Here, the predetermined time period A is, for example, a time period which falls within a range between 0.01 seconds and 1 second, and is set in advance according to measurement accuracy, or the like, of the acceleration sensor 3.

The CPU 4 is configured to include a movement detecting unit 41, a transmission control unit 42 and a timer 43. The CPU 4 acquires various kinds of data from the location information measuring unit 2, the acceleration sensor 3 and the storage unit 6 and outputs location information to the location information transmitting unit 5 at a predetermined timing.

The movement detecting unit 41 determines a movement state of the target (whether the target moves or remains stationary) based on the acceleration data input from the acceleration sensor 3. Note that, in a case where it is determined that the target moves, it is also possible to analyze the acceleration data in more details and identify moving means (such as walking, running, and being aboard a moving body such as a car). In a case where the moving means is identified, an identification result is output to the timer 43. Note that a function of the movement detecting unit 41 is implemented by a predetermined program stored in the storage unit 6 being executed.

Note that the movement state of the target may be determined using combination of the acceleration data and the location data.

The timer 43 is means configured to measure an interval T of location information transmission time. While a predetermined transmission time interval is set in advance at the timer 43, the transmission time interval T can be changed according to the identification result, or the like, of the moving means. For example, in a case where the target is walking, the transmission time interval T is changed to a longer time interval, while, in a case where the target is aboard a moving body, the transmission time interval T is changed to a shorter time interval. Note that the transmission time interval T of the timer 43 can be changed by a predetermined program stored in the storage unit 6 being executed.

The transmission control unit 42 as a transmission judging unit determines whether or not to output the location data to the location information transmitting unit 5 every transmission time interval T based on the movement state of the target. That is, a plurality of pieces of location data acquired during the transmission time interval T are divided into blocks, and whether or not transmission is possible is determined for each block. Hereinafter, the blocked plurality of pieces of location data will be referred to as a location information block. For example, in a case where movement of the target is detected from previous determination until this determination, the location data is output, while, in a case where movement of the target is not detected (in a case where it is determined that the target always remains stationary), it is determined not to output the location information block. Further, for example, in a case where while movement of the target is detected in the previous determination, it is determined that the target remains stationary this time, that is, in a case where the state of the target changes from a movement state to a stationary state from the previous determination until this determination, it may be determined to output the location information block.

In a case where it is determined to output the location data, location information is created by integrating location data included in location information blocks which have not been output yet, and is output to the location information transmitting unit 5. The function of the transmission control unit 42 is implemented by a predetermined program stored in the storage unit 6 being executed.

The location information transmitting unit 5 as a transmitting unit is means configured to transmit location information to a radio communication network 300 such as a 3G base station. The location information transmitted to the radio communication network 300 is aggregated at a cloud server, or the like, which is not illustrated, and is used to monitor or manage the state of the target.

In the storage unit 6, various kinds of programs to be executed at the CPU 4 and set values required for executing the programs are stored. Further, location data acquired by the location information measuring unit 2 is also stored.

(Operation)

Operation of the location information transmission apparatus 1 will be described next.

The target carries the location information transmission apparatus 1.

The CPU 4 loads various kinds of programs required for implementing various kinds of functions such as location information detection and transmission control from the storage unit 6 and starts execution of the programs.

The acceleration sensor 3 starts activation and transmits X axis data, Y axis data and Z axis data to the CPU 4 every predetermined time period A.

Figure 4:
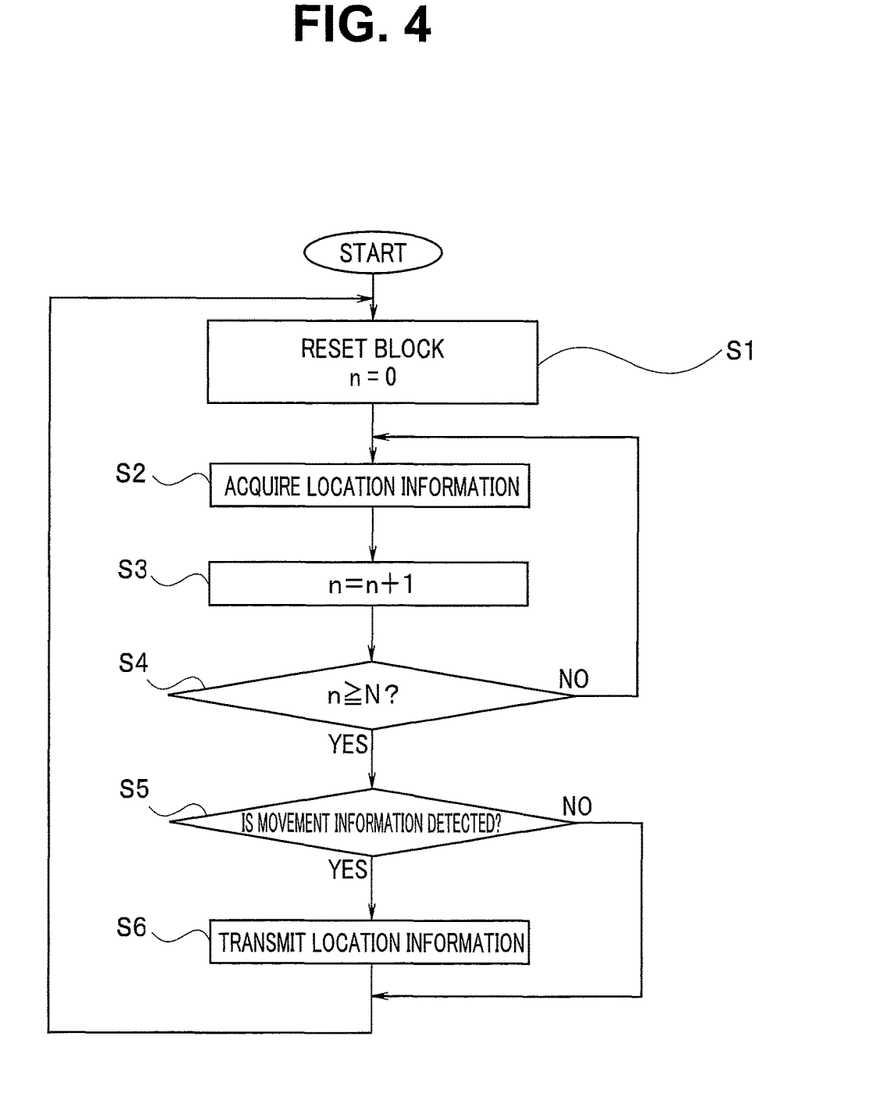
FIG. 4 is a flowchart explaining a location information transmission method of the location information transmission apparatus according to the embodiment.

FIG. 4 is a flowchart explaining a location information transmission method of the location information transmission apparatus according to the embodiment.

As illustrated in FIG. 4, when the CPU 4 starts processing of the transmission control unit 42, the transmission control unit 42 resets the number (=n) of pieces of location data included in a location information block for which it is to be determined next whether or not transmission is possible and sets n=0 (step (hereinafter, abbreviated as S) 1).

Then, the transmission control unit 42 acquires location data from the location information measuring unit 2 (S2). The transmission control unit 42 increments the number of pieces of location data included in the location information block by one every time the location data is acquired (n=n+1) (S3).

It is then determined whether or not the number of counts n of the location data reaches the number of pieces of location data N included in one location information block (S4). N is obtained from an acquisition time interval I of the location data and the transmission time interval T of the location information. For example, in a case where the acquisition time interval I is 10 minutes and the transmission time interval T is 40 minutes, N is T/I=4. In a case where n<N, it is judged that not all of the location data to be output as transmission information with one location information block has been acquired, the processing returns to S2, and next location data is acquired (S4: No). On the other hand, in a case where n≥N, it is judged that all the location data to be output as the transmission information with one location information block has been acquired, and the processing proceeds to S5 (S4: Yes).

In S5, it is determined whether or not location information regarding the location information block can be transmitted. For example, in a case where the movement detecting unit 41 detects movement of the target while location data included in the location information block is acquired (S5: Yes), location data of the location information block which has not been transmitted yet including the location information block is transmitted to the location information transmitting unit 5 (S6), and processing of determining whether or not transmission is possible and transmission processing regarding the information block are finished.

On the other hand, in a case where the movement detecting unit 41 does not detect movement of the target while the location data included in the location information block is acquired, that is, in a case where it is determined that the target remains stationary during the period (S5: No), processing of determining whether or not transmission is possible and transmission processing are finished without the location data of the location information block being transmitted to the location information transmitting unit 5.

When the processing of determining whether or not transmission is possible and transmission processing regarding the location information block are finished, the processing returns to S1 and shifts to processing of a location information block for which it is to be determined next whether or not transmission is possible. By S1 to S6 being repeatedly executed in this manner, location information of the target are continuously transmitted.

Figure 5:
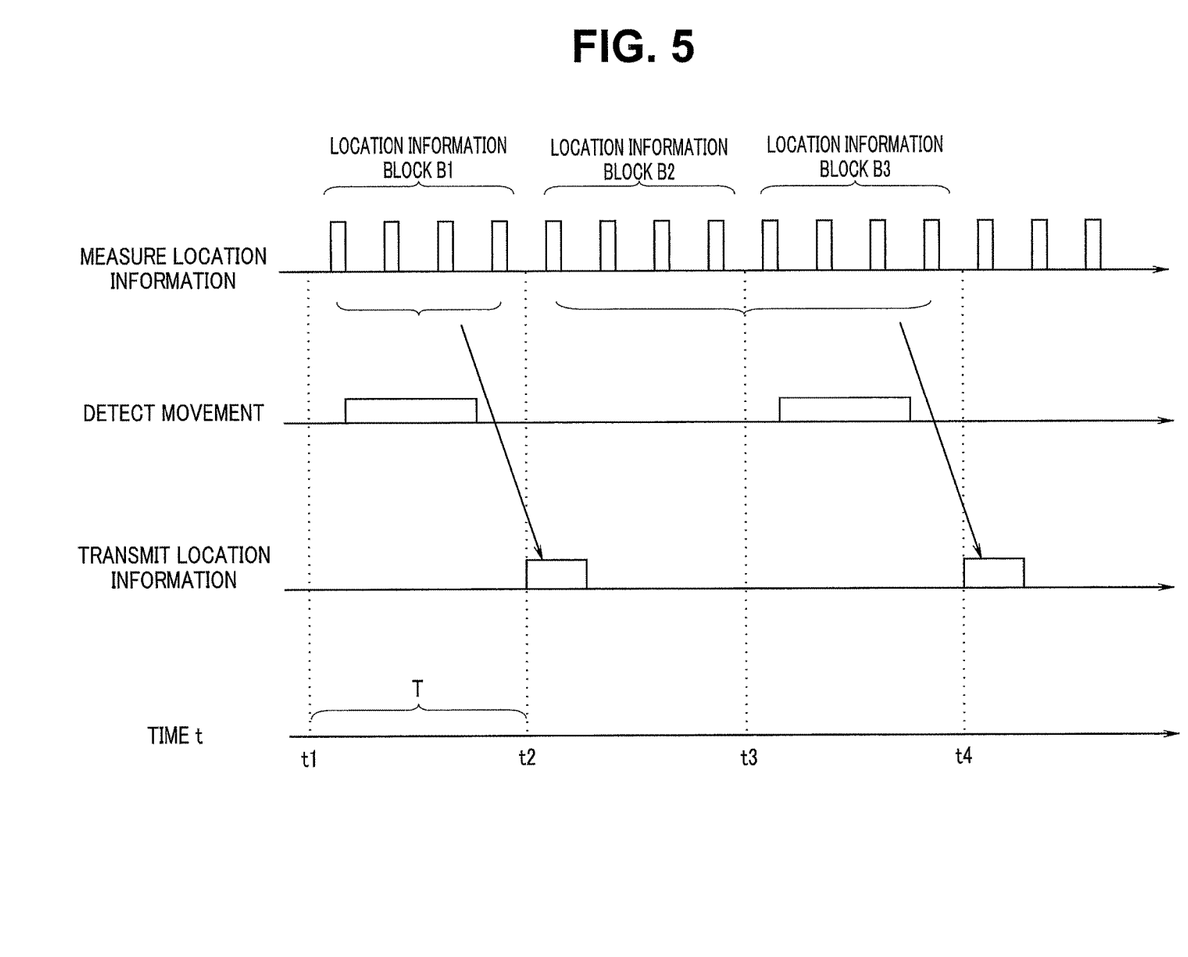
FIG. 5 is a time chart explaining an example of a location information transmission timing of the location information transmission apparatus according to the embodiment.

FIG. 5 is a time chart explaining an example of a location information transmission timing of the location information transmission apparatus according to the embodiment. Determination as to whether or not each location data can be transmitted and a transmission timing will be specifically described using FIG. 5.

First, at time t1, acquisition of location data of a location information block (location information block B1) for which it is to be determined next whether or not transmission is possible is started. Further, detection of a movement state of the target which is required for determining whether or not location information of the location information block B1 can be transmitted, is started. Until the transmission time interval T has elapsed from time t1 and the time reaches time t2, the location information measuring unit 2 acquires location data and stores the location data in the storage unit 6. For example, in a case where the acquisition time interval I of the location data is 10 minutes, and the transmission time interval T is 40 minutes, location data is acquired four times from time t1 to time t2.

At time t2, the transmission control unit 42 determines whether or not to transmit the location data corresponding to four times included in the location information block B1 from the location information transmitting unit 5 to outside. In the example illustrated in FIG. 5, because the movement detecting unit 41 detects movement of the target from time t1 to time t2, the transmission control unit 42 determines that the location information can be transmitted. Therefore, the location data included in the location information block B1 is read out from the storage unit 6 and output to the location information transmitting unit 5.

Further, at time t2, the transmission control unit 42 starts acquisition of location data of a location information block (location information block B2) for which it is to be determined next whether or not transmission is possible. Further, detection of a movement state of the target, which is required for determining whether or not location information of the location information block B2 can be transmitted, is started. Until the transmission time interval T has elapsed from time t2 and the time reaches time t3, the location information measuring unit 2 acquires location data and stores the location data in the storage unit 6.

At time t3, the transmission control unit 42 determines whether or not to transmit location data corresponding to four times included in the location information block B2 from the location information transmitting unit 5 to outside. In the example illustrated in FIG. 5, because the movement detecting unit 41 does not detect movement of the target from time t2 to time t3, the transmission control unit 42 determines not to transmit the location information. Therefore, the location data included in the location information block B2 is maintained in the storage unit 6 without being output to the location information transmitting unit 5.

Further, at time t3, the transmission control unit 42 starts acquisition of location data of a location information block (location information block B3) for which it is to be determined next whether or not transmission is possible. Further, detection of a movement state of the target, which is required for determining whether or not location information of the location information block B3 can be transmitted, is started. Until the transmission time interval T has elapsed from time t3 and the time reaches time t4, the location information measuring unit 2 acquires location data and stores the location data in the storage unit 6.

At time t4, the transmission control unit 42 determines whether or not to transmit location data corresponding to four times included in the location information block B3 and location data corresponding to four times included in the location information block B2 which has not been transmitted yet from the location information transmitting unit 5 to outside. In the example illustrated in FIG. 5, because the movement detecting unit 41 detects movement of the target from time t3 to time t4, the transmission control unit 42 determines that the location information can be transmitted. Therefore, the location data corresponding to eight times including the location data included in the location information block B3 and the location data included in the location information block B2 which has not been transmitted yet is read out from the storage unit 6 and output to the location information transmitting unit 5 together.

In this manner, the location information transmission apparatus of the present embodiment determines whether or not to output transmission data from the location information transmitting unit 5 to outside every time interval T set by the timer 43, at the transmission control unit 42. The determination is performed according to whether or not movement of the target is detected by the movement detecting unit 41. In a case where the movement detecting unit 41 detects movement of the target, information data which has not been transmitted yet is output from the location information transmitting unit 5 to outside. On the other hand, in a case where the movement detecting unit 41 does not detect movement of the target (that is, in a case where it is judged that the target remains stationary), information data is continued to be maintained in the storage unit 6 without being output. Therefore, it is possible to reduce the number of times of transmission of location data to outside, so that it is possible to reduce power consumption and reduce the number of times of charging.

Note that, while, in the above-described embodiment, the transmission control unit 42 determines that location data can be transmitted in a case where movement of the target is detected, the transmission control unit 42 may determine that the location data can be transmitted in a case where a state of the target shifts from a movement state to a stationary state.

Further, while, in the above-described embodiment, it is controlled that location data is not transmitted while the target is put into a stationary state, it is also possible to perform transmission at a longer time interval instead of stopping transmission. For example, it is also possible to perform control so that location data is transmitted for each of one block in a case where the target is put into a movement state, while location data is transmitted for each of three blocks in a case where the stationary state continues.

Further, it is also possible to change a criterion for determining whether or not transmission is possible at the transmission control unit 42 or change the transmission time interval T held by the timer 43 according to an identification result of moving means (such as walking, running, and being aboard a moving body such as a car) of the target by the movement detecting unit 41. For example, in a case where it is identified that the target is walking, the transmission time interval T may be made longer or determination as to whether or not transmission is possible may be performed for each of a plurality of blocks (for example, two blocks).

Note that, while, in the above-described embodiment, the acceleration data is acquired by detecting acceleration by the acceleration sensor 3 every predetermined time period A, the acceleration may be acquired at a smaller sampling frequency, and the acceleration data may be obtained by averaging the acceleration acquired at a smaller sampling rate. According to this configuration, it is possible to obtain acceleration data with higher accuracy.

Each "unit" in the present specification is conceptual expression corresponding to each function in the embodiment and does not necessarily correspond to specific hardware and software routine on a one-to-one basis. Therefore, in the present specification, description has been provided assuming a virtual circuit block (unit) having each function in the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A location information transmission apparatus comprising:
    a location information acquiring unit configured to (1) determine a location of the location information transmission apparatus and (2) generate location data that includes the location of the location information transmission apparatus;
    a storage unit configured to store the location data;
    a transmitting unit configured to transmit the location data stored in the storage unit to a radio communication network;
    a movement detecting unit configured to detect an amount of movement of the location information transmission apparatus; and
    a central processing unit;
    wherein:
    the central processing unit is configured to (1) compile the location data into blocks of location data, a block of location data including (a) the location data generated within a first predetermined time period or (b) a compilation of a first predetermined number of occurrences of the generation of the location data and (2) determine whether or not to cause each of the blocks of location data to be transmitted by the transmitting unit when the each of the blocks of location data is compiled; and
    the central processing unit causes the transmitting unit to transmit one of the blocks of location data to the radio communication network when the movement detecting unit detects an amount of movement equal to or greater than a predetermined amount.

2. The location information transmission apparatus according to claim 1,
    wherein the central processing unit also causes the transmitting unit to transmit the one of the blocks of location data when a second predetermined time period elapses since a previous one of the blocks of location data was transmitted by the transmitting unit or when the number of occurrences of the location data exceeds a second predetermined number of occurrences of the generation of the location data since the previous one of the blocks of location data was transmitted by the transmitting unit.

3. The location information transmission apparatus according to claim 1,
    wherein the movement detecting unit identifies a type of movement according to the amount of movement, and
    the central processing unit changes a criterion for determining whether or not to cause the one of the information blocks to be transmitted according to an identification result of the type of the movement.

4. The location information transmission apparatus according to claim 3,
    wherein the type of the movement includes walking, running, and being aboard a moving body.

5. The location information transmission apparatus according to claim 4,
    wherein, in a case where it is identified by the movement detecting unit that the type of the movement is walking, the central processing unit determines whether or not to cause the transmission of one of the blocks of location data when a plurality of the blocks of location data is acquired.

6. A location information transmission apparatus comprising:
    a location information acquiring unit configured to (1) determine a location of the location information transmission apparatus and (2) generate location data that includes the location of the location information transmission apparatus;
    a storage unit configured to store the location data;
    a transmitting unit configured to transmit the location data stored in the storage unit to a radio communication network;
    a movement detecting unit configured to detect (1) an amount of movement of the location information transmission apparatus and (2) a stationary state or a movement state of the location information transmission apparatus;
    a central processing unit configured to compile the location data into blocks of location data, a block of location data including (a) the location data generated within a first predetermined time period or (b) a compilation of a first predetermined number of occurrences of the generation of the location data;
    wherein:
    when the movement detecting unit detects that a state of the location information transmission apparatus changes from the stationary state to the movement state, the central processing unit causes one of the blocks of location data to be transmitted from the transmitting unit to the radio communication network;
    when the movement detecting unit detects that the state of the location information transmission apparatus remains in the movement state, the central processing unit causes the one of the blocks of location data to be transmitted from the transmitting unit to the radio communication network; and when the movement detecting unit detects the stationary state, the central processing unit determines whether or not to cause the one of the blocks of location data to be transmitted based on the number of occurrences of the location data in the storage unit.

7. A location information transmission apparatus comprising:
- a location information acquiring unit configured to (1) determine a location of the location information transmission apparatus and (2) generate location data that includes the location of the location information transmission apparatus;
- a storage unit configured to store the location data;
- a transmitting unit configured to transmit the location data stored in the storage unit to a radio communication network;
- a movement detecting unit configured to detect an amount of movement of the location information transmission apparatus;
- an acceleration sensor configured to detect acceleration of the location information transmission apparatus; and
- a central processing unit; wherein:
- the movement detecting unit detects a stationary state or a movement state based on acceleration data acquired from the acceleration sensor and detects the amount of movement based on the acceleration data; and
- when the movement detecting unit detects an amount of movement equal to or greater than a predetermined amount, the central processing unit causes the location data to be transmitted from the transmitting unit to the radio communication network.

8. The location information transmission apparatus according to claim 7,
wherein the acceleration data is data obtained by averaging acceleration acquired at a sampling rate smaller than a predetermined time period.

9. A location information transmission apparatus comprising:
- a location information acquiring unit configured to (1) determine a location of the location information transmission apparatus and (2) generate location data that includes the location of the location information transmission apparatus;
- a storage unit configured to store the location data;
- a transmitting unit configured to transmit the location data stored in the storage unit to a radio communication network;
- a movement detecting unit configured to detect an amount of movement of the location information transmission apparatus;
- an acceleration sensor configured to detect acceleration of the location information transmission apparatus; and
- a central processing unit; wherein:
- the movement detecting unit detects a stationary state or a movement state based on acceleration data acquired from the acceleration sensor and the location data acquired by the location information acquiring unit and detects the amount of movement based on acceleration data acquired from the acceleration detected by the acceleration sensor; and
- when the movement detecting unit detects an amount of movement equal to or greater than a predetermined amount, the central processing unit causes the location data to be transmitted from the transmitting unit to the radio communication network.

10. The location information transmission apparatus according to claim 9,
wherein the acceleration data is data obtained by averaging acceleration acquired at a sampling rate smaller than a predetermined time period.

* * * * *